May 3, 1960

C. C. WAUGH ET AL 2,934,897

ROCKET IGNITION SYSTEM

Filed Jan. 26, 1954

INVENTORS.
CHARLES C. WAUGH
WILLIAM C. PARRISH
BY

William R. Lane

ATTORNEY

INVENTORS.
CHARLES C. WAUGH
WILLIAM C. PARRISH
BY
William R. Lane
ATTORNEY

May 3, 1960

C. C. WAUGH ET AL 2,934,897

ROCKET IGNITION SYSTEM

Filed Jan. 26, 1954

INVENTORS.
CHARLES C. WAUGH
WILLIAM C. PARRISH
BY

*William R. Lane*

ATTORNEY

United States Patent Office 2,934,897
Patented May 3, 1960

2,934,897

ROCKET IGNITION SYSTEM

Charles C. Waugh, Tarzana, and William C. Parrish, Puente, Calif., assignors to North American Aviation, Inc.

Application January 26, 1954, Serial No. 406,132

11 Claims. (Cl. 60—39.14)

This invention relates to ignition systems for rockets, and more particularly to an ignition system that will allow propellants admission to the combustion chamber of a rocket motor only after the igniter is functioning properly.

Normally, the starting of a liquid-propellant rocket engine embraces two events. First, an igniter is started in the combustion chamber and second, the propellants are admitted to the combustion chamber. In many cases the nature of the propellants is such that an explosion will result if the igniter is not operating at a temperature sufficient to ignite the propellants when they are admitted to the combustion chamber. Even when the propellants are not spontaneously combustible, or hypergolic, their admission to the combustion chamber before the igniter is functioning properly wastes propellants, since the rocket is inoperative, and is dangerous since an explosion generally accidentally results from such a build-up of propellants in the combustion chamber.

It is therefore necessary to incorporate a fail-safe device which will permit admission of propellants to the combustion chamber only after the igniter is functioning properly. An ignition system is called fail-safe if it is so arranged that any unexpected failure will render the entire system inoperative.

This invention contemplates the use of a fail-safe ignition system that will admit propellants to the combustion chamber of a rocket motor only after the igniter is functioning properly.

It is therefore an object of this invention to provide, for a reaction motor, an ignition system which will prevent a delayed, spontaneous ignition of the propellants.

It is another object of this invention to provide, for a reaction motor, an ignition system that will conserve propellants.

It is still another object of this invention to provide an ignition system for a reaction motor, which system will render the motor inoperative if the propellent igniter fails to fire.

It is a further object of this invention to provide an ignition system that will admit propellants to the combustion chamber of a rocket motor only after the propellent igniter has reached a temperature sufficient to ignite said propellants.

It is still a further object of this invention to provide an ignition system that will prevent build-up of propellants in the combustion chamber of a reaction motor prior to the proper functioning of the propellant igniter.

Other objects of invention will become apparent from the following description taken in connection with the accompanying drawings, in which Fig. 1 is an over-all elevational view of a rocket;

Figure 1:
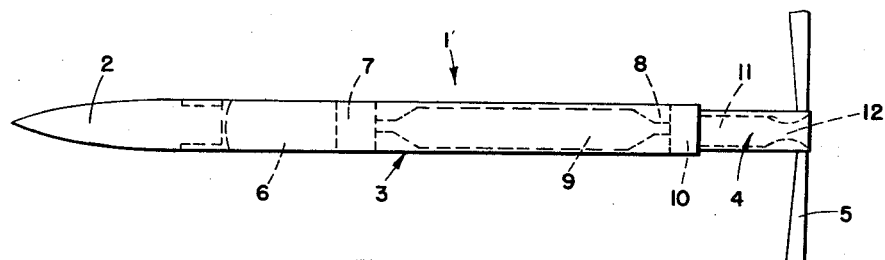

In detail, Fig. 1 shows a conventional rocket 1 having a nose portion 2, usually containing a war head, a central body portion 3, and a tail portion 4, normally housing the rocket motor. The rocket may be stabilized by fins 5 conventionally fixed to tail portion 4. Housed within central body portion 3 are high-pressure tank 6, pressurizer regulator 7, propellant tanks 8, 9, injector assembly 10, and combustion chamber 11, having exhaust nozzle 12 for propulsion purposes.

Figure 2:
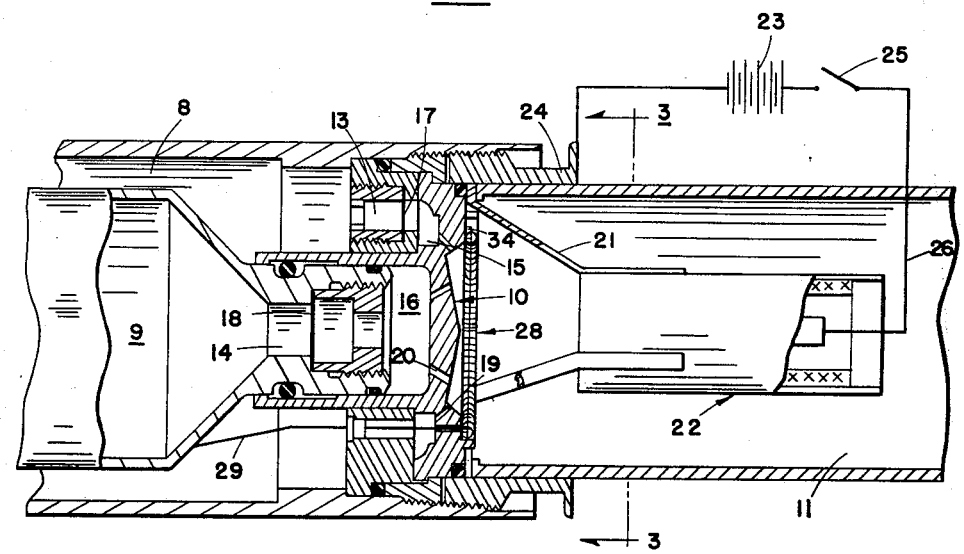
Fig. 2 is a longitudinal sectional view of that portion of the rocket of Fig. 1 adjacent the injector thereof, and showing the preferred form of the temperature actuatable element.
Figure 3:
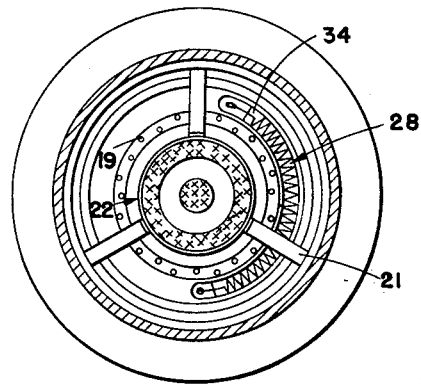
Fig. 3 is a cross-sectional view taken along line 3—3 of Fig. 2.

In Fig. 2 it will be seen that propellant tanks 8, 9 are connected through passageways 13, 14 to chambers 15, 16 in injector assembly 10. Prior to the firing of rocket 1 passageways 13, 14 are separated from chambers 15, 16, respectively, by burst diaphragms 17, 18. It is thus arranged that propellants from tanks 8, 9 will not enter chambers 15, 16 within injector assembly 10 until the pressure in tanks 8, 9 has reached a predetermined amount sufficient to rupture diaphragms 17, 18. Injector ports 19, 20 are provided between chambers 15, 16, respectively, and combustion chamber 11 so that once the propellants are admitted to chambers 15, 16 they will flow into combustion chamber 11.

Mounted within combustion chamber 11 on tripod stand 21 is igniter 22, of the pyrotechnic type, which is adapted to be fired by some outside energy or voltage source 23 shown schematically in Fig. 2 as a battery connected as by wire 26 to said igniter. The schematic wiring diagram shown facilitates the use of tripod 21 and rocket case 24 as the ground and includes switch 25.

Figure 4:
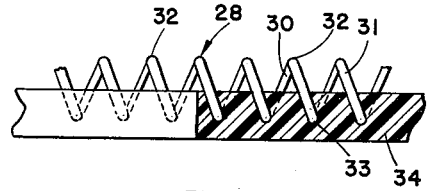
Fig. 4 is a partial view of the temperature actuatable element of Fig. 2, showing the details thereof.

Mounted on the face of injector assembly 10, adjacent combustion chamber 11 and igniter 22, is temperature actuatable element 28 which is grounded at one end to case 24 and has lead wire 29 extending from the other end thereof through injector body 10. Element 28 is seen in Fig. 4 to comprise a series of thermocouples in the form of a helical coil. Alternate halves 30, 31 of each coil are formed of dissimilar metals (as by plating a dissimilar metal on alternate halves of a single-metal coil), thereby forming junctions 32, 33 between said alternate halves. Junctions 32 are open to combustion chamber 11 and are therefore known as "hot" junctions, while junctions 33 are surrounded by plastic mounting strip 34 and are therefore kept at a different temperature, being known as "cold" junctions. In effect, element 28 acts as a thermopile or a plurality of thermocouples connected in series.

Figure 5:
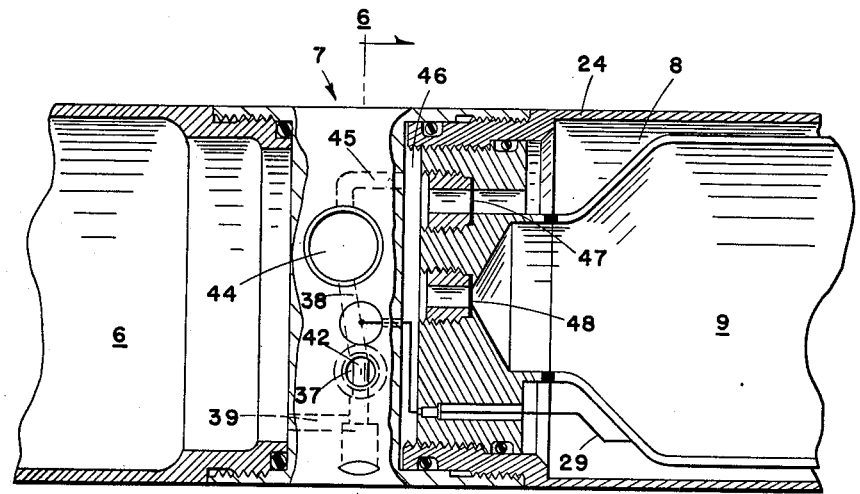
Fig. 5 is a longitudinal sectional view of that portion of the rocket of Fig. 1 adjacent the pressurizer regulator thereof.
Figure 6:
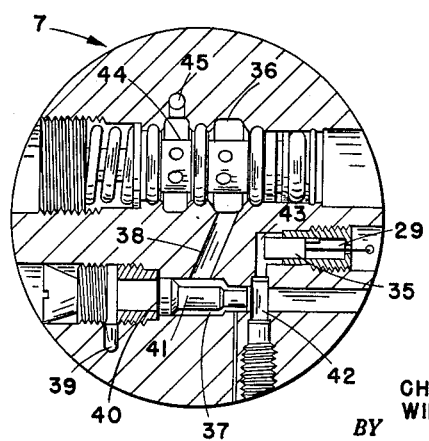
Fig. 6 is a cross-sectional view taken along line 6—6 of Fig. 5.

Lead wire 29 continues forwardly of injector assembly 10 through tank 9 and into pressurizer regulator 7 where it is connected to start cartridge 35 (Figs. 5, 6). Cartridge 35 is also of the type to be fired by an electrical voltage and is also grounded to rocket case 24 in order to complete the circuit between cartridge 35 and element 28.

Pressurizer regulator 7 comprises a disc-shaped mass having two parallel, transverse through-bores 36, 37, and a connecting port 38. Bore 37 communicates with high pressure tank 6 through passageway 39 and is provided with burst diaphragm 40 between passageway 39 and connecting port 38. Supporting diaphragm 40 on the side opposite that connected to pressure tank 6 is support pin 41 which is itself supported against reciprocatory motion in bore 37 by plug 42. Passageway 43 communicates between start cartridge 35 and plug 42, for a purpose to be described.

Bore 36 houses conventional spring actuated pressure regulator 44 and passageway 45 leads therefrom to chamber 46 which, but for burst diaphragms 47, 48, communicates with propellant tanks 8, 9, respectively.

In operation, the firing sequence is initiated by closing switch 25 so as to apply voltage from source 23 to igniter 22. This causes igniter 22 to begin to burn and generate heat. When this heat raises the temperature in chamber 11 to that sufficient to ignite the rocket propellants the design of element 28 is such as to generate sufficient voltage to initiate the firing of start cartridge 35. If the voltage applied to igniter 22 is insufficient to fire said igniter or some other malfunction of said igniter occurs, so that it does not so raise chamber 11 to the required temperature, element 28 does not generate sufficient voltage to fire cartridge 35.

Upon ignition of cartridge 35 it develops expanding gases which flow through passageway 43 and drive plug 42 from its position supporting pin 41. This enables the high pressure gas in tank 6 to force its way through diaphragm 40, driving support pin 41 axially of bore 37, and thence through connecting port 38 into pressure regulator 44. Said pressure regulator allows a flow of gas into chamber 46 sufficient to rupture diaphragms 47, 48 and thereby pressurize propellent tanks 8, 9. Once tanks 8, 9 have been pressurized, the pressure is sufficient to rupture diaphragms 17, 18 (Fig. 2) so that the propellants may enter chambers 15, 16 and thence be introduced into combustion chamber 11 through injector ports 19, 20. Hence, it is assured that the temperature in combustion chamber 11 will be sufficient to ignite the propellants before they are introduced into said combustion chamber.

Figure 7:
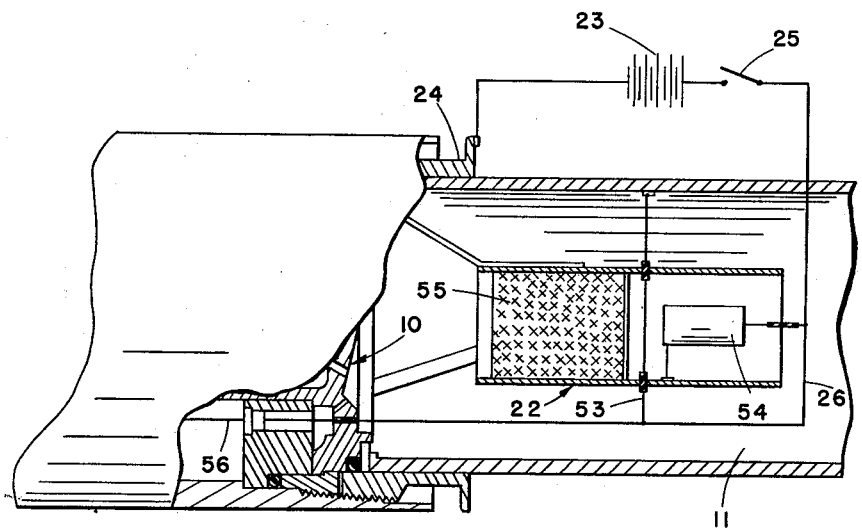
Fig. 7 is a longitudinal sectional view similar to Fig. 2 showing a modified form of temperature actuatable element.

Fig. 7 shows a modified form of temperature actuatable element which comprises a low resistance shunt 53 which is connected across voltage source 23 so as to lie across the face of powder charge 55 of igniter 22 and between said powder charge and squib 54, also of igniter 22. In this case start cartridge 35 is also connected in parallel with voltage source 23 as by lead wire 56 and a ground through case 24. Since shunt 53 is of low resistance, squib 54 must be designed to fire at relatively lower voltage than start cartridge 35.

When the firing sequence is initiated by the closing of switch 25, not only will the current flow to squib 54 to fire igniter 22, but it will also flow through shunt 53. Because of the low resistance of shunt 53, battery 23 is virtually short circuited with only a portion of its rated voltage being applied to start cartridge 35, a voltage insufficient to actuate the start cartridge but sufficient to fire squib 54. When igniter 22 reaches a temperature sufficient to ignite the propellants, shunt 53 will melt applying full battery voltage to the start cartridge and causing a current flow through lead wire 56 to fire start cartridge 35 and thereby release the propellants to injector assembly 10, as previously described.

Figure 8:
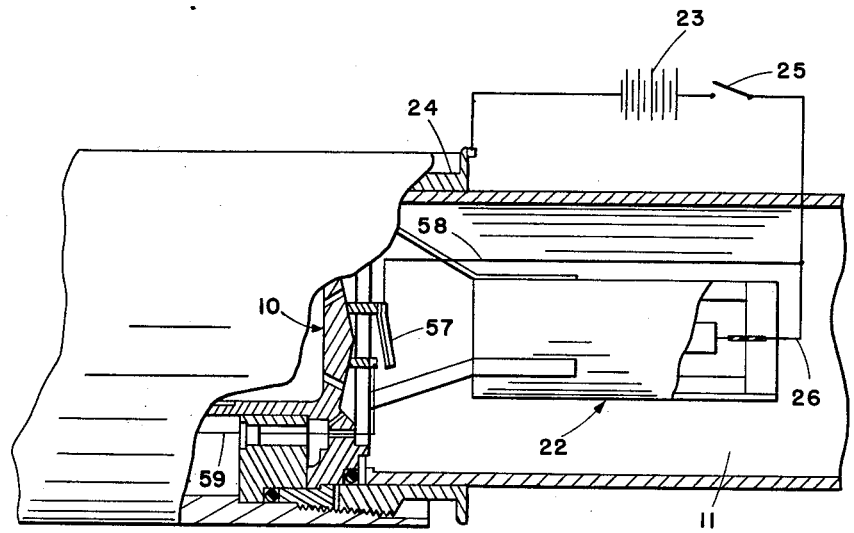
Fig. 8 is a longitudinal sectional view similar to Fig. 2 showing a further modified form of temperature actuatable element.

Fig. 8 shows a further modification of the temperature actuatable element in which said element comprises a temperature actuatable or bimetallic switch 57 connected in series with voltage source 23 and start cartridge 35 as by wires 58, 59. Again, when igniter 22 has been fired and reached a temperature sufficient to ignite the rocket propellants, switch 57 will close thereby allowing a current flow through wire 59 to fire start cartridge 35 and again initiate propellant flow through injector assembly 10 to chamber 11.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In a propulsion system having a combustion chamber, tanks containing propellants, and an injector assembly for introducing said propellants into said chamber, an ignition system comprising an energy source, an element located within and exposed directly to said combustion chamber and actuatable at a temperature sufficient to ignite said propellants, a pyrotechnic igniter connected to said energy source and in said chamber for so actuating said element, and means for admitting said propellants to said injector assembly operatively connected to said element responsive to said propellent ignition temperature whereby said propellants will be introduced into said chamber only when said chamber has reached said temperature.

2. In a reaction motor having a combustion chamber, tanks containing propellants, and an injector assembly for introducing said propellants into said chamber upon pressurization of said tanks, a fail-safe ignition system comprising an energy source, a temperature actuatable element located within and exposed directly to said combustion chamber and, a pyrotechnic igniter connected to said energy source and in said chamber for actuating said element and for igniting said propellants, and means for pressurizing said tanks operatively connected to said element responsive to said propellent ignition temperature whereby said tanks are not pressurized and said propellants are not introduced into said chamber until said chamber reaches a temperature sufficient to ignite said propellants.

3. A hypergolic-propellant propulsion system operative only when its propellants are satisfactorily ignited without explosion comprising a combustion chamber, tanks containing said propellants, an injector assembly for introducing said propellants into said chamber upon pressurization of said tanks, and a fail-safe ignition system including an energy source, an element located within and exposed directly to said combustion chamber and actuatable at a temperature sufficient to ignite said propellants, an igniter connected to said energy source for actuating said element and for igniting said propellants in said chamber, and means for pressurizing said tanks operatively connected to said element responsive to said propellent ignition temperature whereby said tanks are not pressurized and said propellants are not introduced into said chamber until said chamber reaches said temperature.

4. In a rocket having a combustion chamber, tanks containing propellants, and an injector assembly for introducing said propellants into said chamber upon pressurization of said tanks, a fail-safe ignition system comprising an energy source, an element exposed to said combustion chamber and actuatable at a temperature sufficient to ignite said propellants, an igniter connected to said energy source for actuating said element and for igniting said propellants in said chamber, and means for pressurizing said tanks including a pressure source, a burst diaphragm separating said pressure source from said tanks, means supporting said diaphragm preventing bursting thereof and means operatively connected to said element and responsive to said propellent ignition temperature for removing said support means allowing bursting of said diaphragm whereby said tanks are not pressurized and said propellants are not introduced into said chamber until said chamber reaches said temperature.

5. In a rocket having a combustion chamber, tanks containing propellants, and an injector assembly for introducing said propellants into said chamber upon pressurization of said tanks, a fail-safe ignition system comprising an energy source, a thermocouple exposed to said combustion chamber for producing a voltage of a predetermined magnitude upon being heated to the ignition temperature of said propellants, an igniter connected to said energy source for so heating said thermocouple and for igniting said propellants in said chamber, and means for pressurizing said tanks including a pressure source, a burst diaphragm separating said pressure source from said tanks, means supporting said diaphragm preventing bursting thereof and means responsive to said voltage produced in said thermocouple responsive to said propellent ignition temperature for removing said supporting means allowing bursting of said diaphragm whereby said tanks are pressurized.

6. In a rocket having a combustion chamber, tanks containing propellants, and an injector assembly for introducing said propellants into said chamber upon pressurization of said tanks, a fail-safe ignition system comprising a voltage source, a low-resistance shunt exposed to said combustion chamber and connected across said voltage source and meltable upon being heated to the ignition temperature of said propellants, an igniter connected across said voltage source for so heating said shunt and for igniting said propellants in said chamber, and means for pressurizing said tanks including a pressure source, a burst diaphragm separating said pressure source from said tanks, means supporting said diaphragm preventing bursting thereof and means responsive to said voltage source only when said shunt is melted for removing said support means allowing bursting of said diaphragm whereby said tanks are not pressurized and said propellants are not introduced into said chamber until said shunt has melted.

7. In a rocket having a combustion chamber, tanks containing propellants, and an injector assembly for introducing said propellants into said chamber upon pressurization of said tanks, a fail-safe ignition system comprising a voltage source, a switch exposed to said combustion chamber and connected in series with said voltage source and closeable upon being heated to the ignition temperature of said propellants, an igniter connected across said voltage source independently of said switch for so heating said switch and for igniting said propellants in said chamber, and means for pressurizing said tanks including a pressure source, a burst diaphragm separating said pressure source from said tanks, means supporting said diaphragm preventing bursting thereof and means operatively connected to said voltage source only through said switch and responsive to said propellant ignition temperature for removing said support means allowing bursting of said diaphragm whereby said tanks are not pressurized and said propellants are not introduced into said chamber until said switch reaches said temperature.

8. In a rocket having a combustion chamber, tanks containing propellants, and an injector assembly for introducing said propellants into said chamber upon pressurization of said tanks, a fail-safe ignition system comprising an energy source, an element exposed to said combustion chamber and through which an electric current will flow when said element is heated to a temperature sufficient to ignite said propellants, an igniter connected to said energy source for so heating said element and for igniting said propellants in said chamber, and means for pressurizing said tanks, including a pressure source, a burst diaphragm separating said pressure source from said tanks, means supporting said diaphragm preventing bursting thereof and a means operatively connected to said element and responsive to said current for removing said support means allowing bursting of said diaphragm, whereby said tanks are not pressurized and said propellants are not introduced into said chamber until said element reaches said temperature.

9. In a rocket having a combustion chamber, tanks containing propellants, and an injector assembly for introducing said propellants into said chamber upon pressurization of said tanks, a fail-safe ignition system comprising an energy source, a thermocouple for producing a voltage of predetermined magnitude upon being heated to the ignition temperature of said propellants, a pyrotechnic igniter connected to said energy source for so heating said thermocouple and for igniting said propellants in said chamber, and means for pressurizing said tanks including a pressure source, a burst diaphragm separating said pressure source from said tanks, a pin supporting said diaphragm, and explosive means responsive to said voltage produced in said thermocouple for removing said pin from its supporting position and allowing said diaphragm to rupture whereby said tanks are not pressurized and said propellants are not introduced into said chamber until said igniter reaches said temperature.

10. In a rocket having a combustion chamber, tanks containing propellants, and an injector assembly for introducing said propellants into said chamber upon pressurization of said tanks, a fail-safe ignition system comprising a voltage source, a low-resistance shunt exposed to said combustion chamber, connected across said voltage source and meltable upon being heated to the ignition temperature of said propellants, a pyrotechnic igniter connected across said voltage source for so heating said shunt and for igniting said propellants in said chamber, and a means for pressurizing said tanks including a pressure source, a burst diaphragm separating said pressure source from said tanks, a pin supporting said diaphragm, and explosive means responsive to said voltage source only when said shunt is melted for removing said pin from its supporting position and allowing said diaphragm to rupture whereby said tanks are not pressurized and said propellants are not introduced into said chamber until said igniter reaches said temperature.

11. In a rocket having a combustion chamber, tanks containing propellants, and an injector assembly for introducing said propellants into said chamber upon pressurization of said tanks, a fail-safe ignition system comprising a voltage source, a bi-metallic switch exposed to said combustion chamber and connected in series with said voltage source and closeable upon being heated to the ignition temperature of said propellants, a pyrotechnic igniter connected across said voltage source independently of said switch for so heating said switch and for igniting said propellants in said chamber, and means for pressurizing said tanks, including a pressure source, a burst diaphragm separating said pressure source for said tanks, a pin supporting said diaphragm and explosive means operatively connected and responsive to said voltage source only through said switch for removing said pin from its supporting position and allowing said diaphragm to rupture whereby said tanks are not pressurized and said propellants are not introduced into said chamber until said igniter reaches said temperature.

References Cited in the file of this patent
UNITED STATES PATENTS

| | | |
|---|---|---|
| 2,470,564 | Lawrence et al. | May 17, 1949 |
| 2,479,888 | Wyld et al. | Aug. 23, 1949 |
| 2,518,882 | Goddard | Aug. 15, 1950 |
| 2,743,577 | Malik | May 1, 1956 |